W. H. ELLIOT.
Hay Spreader.
No. 86,516.   Patented Feb. 2, 1869.
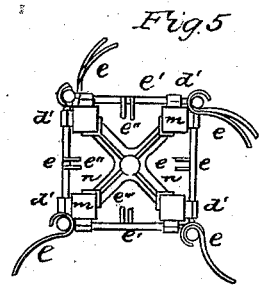
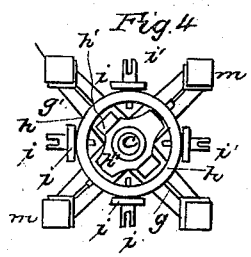
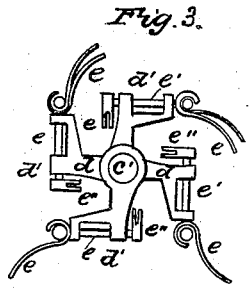
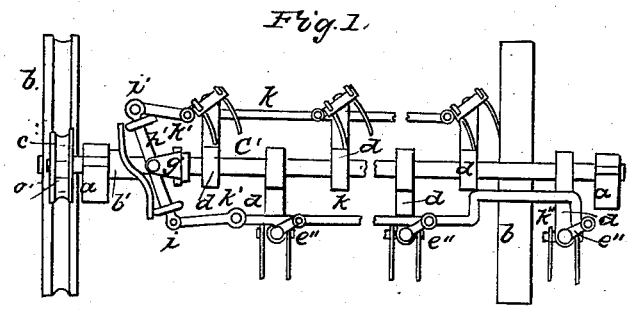
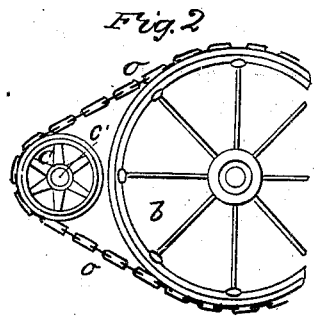
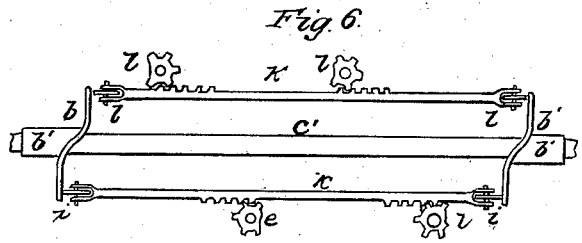
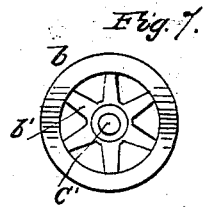
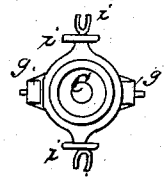
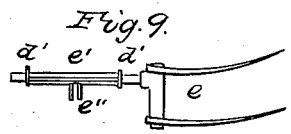
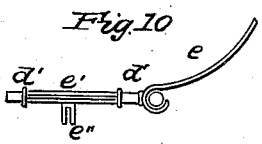
Witnesses
M. L. Elliot
Inventor
Wm. H. Elliot

WILLIAM H. ELLIOT, OF NEW YORK, N. Y.

Letters Patent No. 86,516, dated February 2, 1869.

IMPROVEMENT IN HAY-SPREADERS.

The Schedule referred to in these Letters Patent and making part of the same.

*To all whom it may concern:*

Be it known that I, WILLIAM H. ELLIOT, of the city, county, and State of New York, have invented a new and improved Hay-Turner and Spreader; and I do hereby declare that the following is a full and exact description thereof, reference being had to the accompanying drawings, and to the letters of reference marked thereon.

Similar letters of reference indicate the same devices in all the figures.

To enable others skilled in the art to comprehend, make, and use my invention, I will proceed to describe its nature, construction, and operation.

The nature of my invention consists in turning the spreading-fork upon the axis of its handle, for the purpose of turning the hay over, and also for the purpose of disengaging it from the hay, so as to leave it lying upon the ground in a proper condition for drying.

It also consists in the employment of cams, rolls, and connecting-rods, for giving motion to the forks to turn them over; and in the employment of a yoke to which the several connecting-rods are pivoted, for the purpose of conveying motion to the forks; and It further consists in a peculiar arrangement of the tines, in relation to the handles or shafts of the forks and to the axis of the reel.

In speaking of the fork, I mean the tines, together with the handle or shaft which supports it or attaches the tines to the reel.

Figure 1 is a rear elevation of a reel having two lines of forks upon it, and showing the wheels of the machine.

Figure 2 is a side elevation of a driving-wheel and driving-pulley, showing a chain-belt around them.

Figure 3 is a section of a reel, showing four lines of forks.

Figure 4, end elevation of a reel of different construction.

Figure 5, section of the same.

Figure 6, a modification of my invention, showing the employment of racks and pinions to communicate the motion of the connecting-rods to the forks.

Figure 7, elevation of a cam.

Figure 8, elevation of a yoke.

Figures 9 and 10, elevations of a fork, showing necessary curves.

$a$, portion of the frame of the machine.
$b$, wheels.
$c$, driving-pulley on the reel.
$c'$, shaft of the same.
$d$, arms supporting the forks.
$d'$, bearings of the forks.
$e$, fork-tines.
$e'$, handles of shafts of the same.
$e''$, arms or cranks on the handles of the forks.
$f$, cams.
$f'$, hollow hubs of the cams.
$g$, support of the yoke keyed to shaft $e'$.
$g'$, casting forming the end of reel.
$h$, yoke.
$h'$, ears on casting $g$.
$h''$, central portion of the double yoke, fig. 4.
$i$, rollers on the yoke.
$i'$, joints on the yoke, to which connecting-rods, $k$, are pivoted.
$k''$, curves in the connecting-rods opposite the wheel, so as to reduce the size of the reel at that point.
$l$, gears, which work in racks on the connecting-rods.
$m$, frame of the reel, figs. 4 and 5.
$n$, braces of the same.
$o$, chain connecting the driving-wheel with the driving-pulley.
$o'$, teeth on the driving-pulley to catch the links of chain $o$.
$k'$, joint in the connecting-rods.

My invention relates to that kind of machine used for spreading hay, usually called tedders, and the object of my invention is to operate the spreading-forks in such a way that they shall turn the hay over after lifting it from the ground, by turning the fork upon the axis of its shaft, or handle, so as to imitate, as nearly as possible, the movement of the hay-fork, when used by hand for that purpose; and The operation of my machine is as follows:

The driving-wheel and the pulley on the shaft of the reel have a groove in their faces for the reception of a chain, which serves as a belt for driving the reel. By reel, I mean all that portion of the machine which is attached to and revolves with the shaft $c'$.

The cams $f$ are stationary, being attached to the frame of the machine by means of their hubs, $f'$.

As the reel is revolved by the chain $o$, the rolls $i$, upon the yoke, roll around on the face of the cam, giving to the yoke and connecting-rods a motion corresponding with the irregularity of the face of the cam.

To the connecting-rods, the cranks $e''$, on the shafts of the forks, are pivoted, so that the irregularity of the face of the cam communicates to the forks a regular oscillating motion, turning them upon the axis of their shafts nearly half a revolution.

The hub $f'$ is hollow, the shaft $c'$ passing through it. This hub passes through the frame of the machine, and serves as a bearing for the shaft $c'$.

The cam is adjustable both in turning upon the axis of its hub and in the distance of its face from the yoke, so that the forks may be made to move and remain stationary at the necessary points in the revolution of the reel, and also so that the cam may be kept in proper contact with the yoke.

The cam should be so adjusted that the forks will turn over as soon as the hay is lifted from the ground, by which motion the hay will be well shaken and completely turned over.

Figs. 9 and 10 show the necessary curve and position the tines should have in relation to the handle, when turned upon their axis by cranks, as in that case the forks cannot receive from the connecting-rods quite half a revolution; it therefore requires some lateral curve, as seen in fig. 9, to facilitate the release of the hay from the fork.

The forks, however, may be turned by rack and pinion, as shown in fig. 6. In that case they may be turned a complete half revolution, and would require no lateral curve, but would require only the forward curve, as shown in fig. 10.

It may be seen, by reference to figs. 3, 5, and 10, that the tines are so arranged, in relation to the handle, and the handle also so arranged in relation to the axis of the reel, that when the tines are in a position designed to catch the hay, they stand radially to the axis of the reel, but when turned over, their positions coincide, or nearly coincide, with the orbit of their own revolution upon the axis of the reel; they therefore pass out of the hay without imparting any motion to it.

In case two lines of forks are used upon the reel, a single yoke, such as is represented in figs. 1 and 8, may be employed.

The support $g$ is keyed to the shaft $c'$, and pivoted to the yoke, and the connecting-rods are also pivoted to the yoke at the joints $i'$.

In case four lines of forks are used on the reel, a double yoke, such as is seen in fig. 4, may be used.

This yoke is composed of the central portion $h''$, ring $h$, rolls $i$, and joints $i'$, and is capable of being tilted in any direction.

The ears $h'$ are a part of the casting $g'$, which forms the end of the reel. Between these ears the central piece $h''$ is pivoted, and this in turn is pivoted at its ends to ring $h$, so that while it is fastened to and revolves with the shaft $c'$, it is left free to yield at any point to the irregularity of the cam.

A reel, such as is represented by figs. 4 and 5, has no central shaft, but has, instead, four timbers, $m$, running its whole length, which are bolted at each end to castings $g$, and supported in the middle brace by $n$. These timbers form suitable supports for the four lines of forks.

The method of turning the forks, represented in fig. 6, requires no yoke, the rolls being placed in the ends of the connecting-rods, with a cam at each end.

These rods require suitable supports to slide through. In this case one cam would be as effectual as two, provided there were two rolls on each connecting-rod, one on each side of the cam.

There are many other modifications of my invention, such as giving to the forks a complete revolution with each revolution of the reel, either by a regular or an irregular gear, or the forks might have two revolutions upon the axis of the handle, to one revolution upon the axis of the reel, but these would all be equivalents of the invention shown in figs. 1, 2, and 3.

Having described my invention,

I desire to have secured to me by Letters Patent of the United States, the following claims:

1. Turning the forks of a hay-tedder upon the axis of their handles, for the purpose of turning the hay, substantially as described.

2. Turning the forks of a hay-tedder upon the axis of their handles, for the purpose of releasing the hay, substantially as described.

3. The arrangement of the tines and handle in relation to each other and to the axis of the reel, substantially as and for the purpose specified.

4. The combination of cam $f$ and connecting-rods $k$ with forks that turn upon the axis of their handles, substantially as and for the purpose set forth.

5. The combination of cam $f$, yoke $h$, and connecting-rod $k$, as and for the purpose set forth.

WM. H. ELLIOT.

Witnesses:
M. L. ELLIOT,
H. STEINERT.